Feb. 28, 1939.　　　　H. R. TEAR　　　　2,149,127
LUBRICATING DEVICE
Filed Aug. 26, 1936　　　2 Sheets-Sheet 1
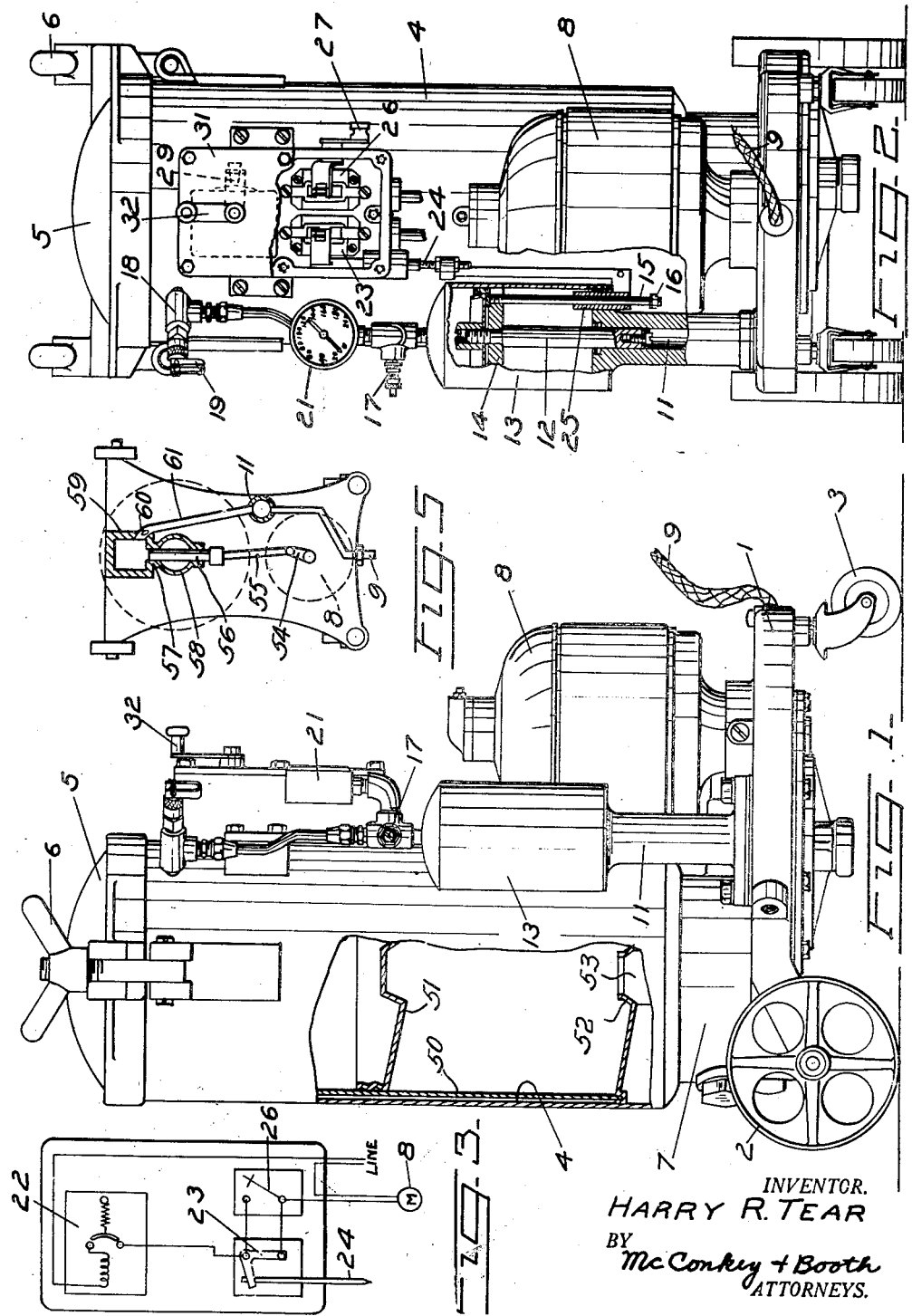
INVENTOR.
HARRY R. TEAR
BY McConkey + Booth
ATTORNEYS.

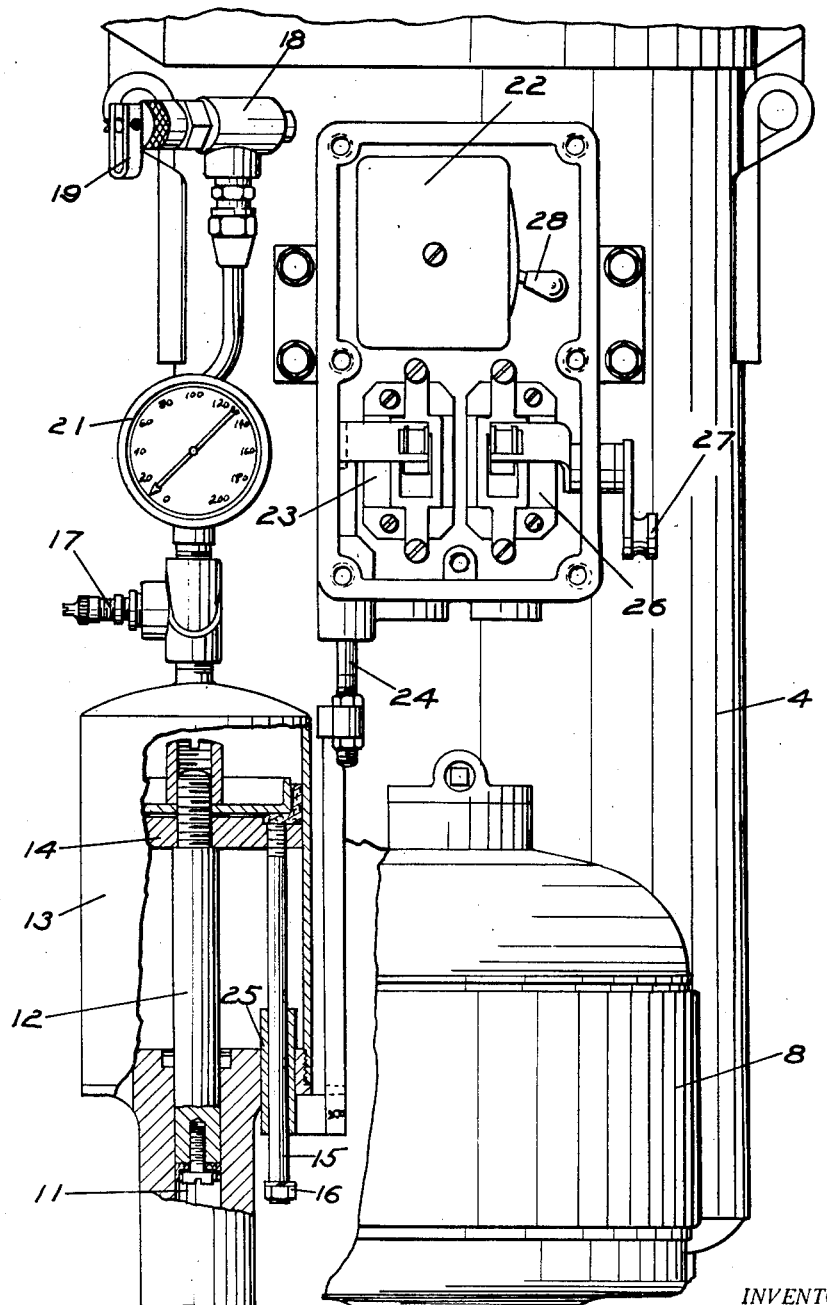

Patented Feb. 28, 1939

2,149,127

UNITED STATES PATENT OFFICE 2,149,127

LUBRICATING DEVICE

Harry R. Tear, Evanston, Ill., assignor to The Lubrication Corporation, Chicago, Ill., a corporation of Delaware Application August 26, 1936, Serial No. 97,900

6 Claims. (Cl. 221—47.1)

This invention relates to lubricating devices and more particularly to automatically controlled power operated lubricant dispensers.

One of the objects of the invention is to provide a power-operated dispenser in which the operation of the power means is controlled according to the accumulation of a predetermined volume of lubricant under pressure and in which the accumulated volume of lubricant is under a substantially constant pressure.

Another object of the invention is to provide a power-operated lubricant dispenser in which operation of the power mechanism is controlled according to a balance between the lubricant discharge pressure and a substantially constant fluid pressure.

Another object is to provide a power-operated lubricant dispenser including automatic means to control operation thereof and in which operation of the automatic means can be manually superseded at will.

Other objects, advantages and novel features of the invention will be apparent from the following description when read in connection with the accompanying drawings, in which:

Figure 1 is a side elevation with parts in section of a lubricant dispenser embodying the invention;

Figure 2 is a front elevation of the dispenser of Figure 1 with parts broken away and in section;

Figure 3 is a wiring diagram of the control mechanism of the dispenser;

Figure 4 is an enlarged partial view similar to Figure 2, and

Figure 5 is a horizontal section through the pump.

The invention may be embodied in a lubricant dispenser including a reservoir and a power-operated pump for withdrawing lubricant from the reservoir and discharging it under pressure to a desired point of use, as for example, through a flexible conduit terminating in any suitable type of discharge nozzle. The pump discharge communicates with an accumulator including an expansible chamber subjected on one side to the pressure of the lubricant discharge and on its other side to air pressure. Preferably the air pressure side of the accumulator is connected to the reservoir so that air pressure assists in forcing lubricant from the reservoir to the pump and also to provide a large volume whereby air pressure on the accumulator will remain substantially constant regardless of movement thereof.

The accumulator is connected to a suitable switch or other control means for the power means whereby the power means will be stopped after a predetermined volume of lubricant under pressure has been accumulated. A manually-operable control is preferably provided in parallel with the automatic control whereby the automatic control may be superseded when it is desired to obtain a higher pressure than that for which the automatic control is set.

The dispenser illustrated comprises a base 1 preferably mounted on wheels 2 and casters 3 whereby it may be moved easily to any desired point of use. The base 1 supports a barrel or reservoir 4 which is closed by a tight fitting dome-shaped cap 5 secured thereto by wing nuts 6 or the like and it may serve either as a container for bulk lubricant or as a housing for an interchangeable factory-filled lubricant cartridge. Preferably a suitable piston or follower plate is provided to overlie the upper surface of the lubricant in either case to prevent piercing thereof by the air and to insure that all lubricant in the container or cartridge will be forced out.

As shown in Figure 1, a lubricant cartridge 50 containing a follower piston 51 is mounted in the reservoir 4 and is formed with an outlet opening 52 in one end to seat on a stud 53 on the base 1. The stud is formed with a passage to conduct lubricant to the pump inlet as will appear hereinafter.

A suitable pump indicated at 7 is mounted on the base 1 to be driven by an electric motor 8 and is connected to the reservoir 4 to receive lubricant therefrom, the lubricant being dispensed under pressure through a suitable conduit 9. The pump outlet communicates with the lower portion of a cylinder 11 forming a portion of an accumulator and having a piston 12 slidably fitted therein. A cylinder 13, preferably larger than the cylinder 11, is arranged coaxially therewith and slidably receives a piston 14 which is rigidly connected to the piston 12. The piston 14 is secured to a rod 15 which extends through the lower end of the cylinder 13 and has an abutment 16 such as a nut or the like secured on the end thereof.

As best seen in Figure 5 the motor 8 drives a crank 54 which is connected through a connecting rod 55 to a pump piston 56. The piston 56 is slidable in a cylinder 57 having an enlarged portion 58 communicating with the stud 53 and an outer enlarged portion 59 connected through a suitable check valve 60 to a passage 61. The passage 61 is connected to the accumulator cylinder 11 and to the outlet conduit 9 as shown.

Air under pressure may be supplied to the accumulator cylinder 13 and to the upper portion of the reservoir 4 through a valved fitting 17 which is adapted to be connected to a conventional air hose or other suitable source of compressed air. The connection preferably includes a relief valve 18 to prevent building up of excessive pressure in the reservoir 4 and the accumulator, and a controlling handle 19 is preferably provided by which the relief valve 18 may be opened to permit the escape of compressed air when it is desired to refill the reservoir 4 or to place a fresh lubricant cartridge therein. A suitable pressure gauge 21 may be provided if desired to indicate the air pressure in the reservoir and accumulator.

Operation of the electric motor 8 is controlled by means of a suitable motor switch 22 of any desired type which preferably includes an overload safety device by means of which the flow of current to the motor will automatically be interrupted in case the current reaches a dangerously high value. The switch 22 as best seen in Figure 3 is connected in series with a switch 23 whereby both switches 22 and 23 must be closed before the motor 8 will be energized. The switch 23 is adapted to be controlled by means of a plunger rod 24 which is connected at its lower end to a sleeve 25 extending through and slidable with respect to the lower end of the accumulator cylinder 13. The sleeve 25 surrounds and is slidable relatively to the rod 15 and extends a sufficient distance into the cylinder 13 so that it will be engaged and forced downwardly by the piston 14 when the latter approaches the lower end of its stroke.

It will be noted that as the piston 14 and rod 15 rise in response to lubricant pressure on the lower end of the piston 12 the nut 16 will engage the sleeve 25 and move it upwardly together with the plunger rod 24. In this way the switch 23 is controlled by operation of the accumulator. A second manually operable switch 26 having a control handle 27 is connected in parallel with the switch 23 whereby operation of the switch 23 is rendered ineffective when the switch 26 is closed.

The switch 22 is controlled by means of a handle 28 which is received in the bifurcated end of a lever 29 (Figure 2) pivoted on the cover 31 of the switch casing. A suitable operating handle 32 extends through the cover 31 and is connected to the lever 29 for controlling the same.

The switch 26 is normally open and the switch 23 is normally closed. When it is desired to use the dispenser the control switch 22 may be closed, thereby completing a circuit through switch 23 and through the motor. The motor drives the pump 7 to build up a pressure in the discharge conduit 9, the same pressure being communicated to the cylinder 11 below the piston 12 and tending to urge the piston 12 upwardly. It will be apparent that the pressure required to urge the piston 12 upwardly will be determined by the relative sizes of the pistons 12 and 14 and by the air pressure existing in the accumulator cylinder 13 above the piston 14. As the motor and pump continue to operate, if lubricant under pressure is not dispensed from the conduit 9 as fast as it is supplied by the pump, lubricant will accumulate in the cylinder 11 thus forcing the pistons 12 and 14 upwardly.

It will be noted that the pressure resisting upward motion of the piston 14 is substantially constant throughout its entire stroke due to the fact that its displacement is relatively small in comparison with the total volume of air in the accumulator and in the reservoir 4, so that movement of the piston 12 depends chiefly on the volume of lubricant accumulated, practically regardless of the pressure at which it is accumulated.

As the pistons 12 and 14 rise, the rod 15 will be moved upwardly until the nut 16 engages the lower end of the sleeve 25 and upon continued upward movement will raise the sleeve 25 and rod 24 thereby opening the switch 23 and interrupting the motor circuit. The motor will remain stopped until sufficient lubricant has been withdrawn through the conduit 9 to permit the pistons 12 and 14 to move downwardly to such an extent that the piston 14 will engage the upper end of the sleeve 25 and urge it, together with the rod 24, downwardly to close the switch 23 again. This will re-establish the circuit through the motor and the motor will again operate the pump as described above.

If it is desired to obtain a higher pressure than that for which the accumulator is set, as for example, in order to lubricate a clogged or so-called "frozen" bearing, the switch 26 may be closed manually so that the motor will continue to operate even though the switch 23 is opened by action of the accumulator. The accumulator and the switch 23 are wholly ineffective when the switch 26 is closed, the accumulator pistons 12 and 14 merely rising to their uppermost position and remaining there during this time. If the discharge conduit 9 should inadvertently be closed off while the switch 26 is closed or if the pressure required is such as to create a dangerous overload on the motor, the motor will draw an excessive amount of current and the control switch 22 will operate automatically to prevent burning out the motor or building up dangerously high lubricant pressures in the device. It will be understood that the switch 26 is normally closed for only very short periods and then when the device is under the direct observation of an operator.

While one embodiment of the invention has been illustrated and described in detail, it will be apparent that many changes might be made therein and it is not intended to be limited to the exact forms shown or otherwise than by the terms of the appended claims.

I claim:

1. A lubricating device comprising, a source of lubricant, a pump connected to said source for dispensing lubricant under pressure, an expansible chamber communicating with the pump outlet to be expanded in response to the pressure of lubricant discharged by the pump, fluid pressure means including a differential piston for resisting expansion of said chamber, a connection from said fluid pressure means to said source whereby lubricant at said source is subjected to fluid pressure, and means operated by expansion and contraction of said chamber for controlling operation of the pump.

2. A lubricating device comprising, a source of lubricant, a pump connected to said source for dispensing lubricant under pressure, an expansible chamber communicating with the pump outlet to be expanded in response to the pressure of lubricant discharged by the pump, fluid pressure means including a differential piston for resisting expansion of said chamber, a connection from said fluid pressure means to said source whereby lubricant at said source is subjected to fluid pressure, means operated by expansion and contraction of said chamber for controlling operation of the pump, and manual means for rendering said last-named means inoperative to control the pump.

3. A lubricating device comprising a lubricant reservoir having a piston therein, said reservoir providing a space for air under pressure to urge the piston through the reservoir, a pump connected to said reservoir to receive lubricant therefrom, a motor for operating said pump, an expansible chamber connected to said pump outlet, a differential piston controlling expansion of said chamber, a connection from the differential piston to said space whereby the air pressure in said space will act on the differential piston to resist expansion of the chamber, and means operated by expansion and contraction of the chamber for controlling operation of the motor.

4. A lubricating device comprising a lubricant reservoir having a piston therein, said reservoir providing a space for air under pressure to urge the piston through the reservoir, a pump connected to said reservoir to receive lubricant therefrom, a motor for operating said pump, an expansible chamber connected to said pump outlet, a differential piston controlling expansion of said chamber, a connection from the differential piston to said space whereby the air pressure in said space will act on the differential piston to resist expansion of the chamber, means operated by expansion and contraction of the chamber for controlling operation of the motor, and manual means for controlling said motor adapted to supercede said last-named means.

5. A lubricating device comprising a lubricant reservoir having a piston therein, said reservoir providing a space for air under pressure to urge the piston through the reservoir, a pump connected to said reservoir to receive lubricant therefrom, a motor for operating said pump, a cylinder connected to the pump outlet, a piston slidable in said cylinder, a second cylinder coaxial with said first cylinder, a piston in said second cylinder connected to said first piston, a connection from said second cylinder to said space, whereby movement of the pistons in response to lubricant pressure on said first piston will be resisted by air pressure on said second piston, and means operated by movement of said pistons to control the motor.

6. A lubricating device comprising, a lubricant reservoir having a piston therein, said reservoir providing a space for air under pressure to urge the piston through the reservoir, a pump connected to receive lubricant from the reservoir and dispense it under pressure, an electric motor for operating said pump, a pair of cylinders, one connected to the pump discharge and the other to said space, interconnected pistons in said cylinders, a switch for controlling said motor connected to be operated by movement of said pistons, a second switch shunted across the first switch, resilient means for normally holding said second switch open, and manual means to close said second switch.

HARRY R. TEAR.